Feb. 27, 1973  G. KRENZ  3,718,294
WING ARRANGEMENT FOR A V/STOL AIRCRAFT
Filed March 11, 1971  2 Sheets-Sheet 1

*Inventor:*
Günter Krenz

BY Spencer & Kaye
ATTORNEYS.

United States Patent Office
3,718,294
Patented Feb. 27, 1973

3,718,294
WING ARRANGEMENT FOR A V/STOL AIRCRAFT
Gunter Krenz, Bremen, Germany, assignor to Vereinigte Flugtechnische Werke-Fokker GmbH, Bremen, Germany
Filed Mar. 11, 1971, Ser. No. 123,161
Claims priority, application Germany, Mar. 14, 1970, P 20 12 243.4
Int. Cl. B64c 3/38, 15/00
U.S. Cl. 244—46                    6 Claims

ABSTRACT OF THE DISCLOSURE

A vertical/short takeoff and landing (V/STOL) aircraft with a delta wing which is provided with a power unit assembly to produce vertical and/or horizontal thrust. Means are provided which control the slight interference between power unit and airframe air flows. The delta wing may also have different sweepback in that it may be designed to have a leading edge which is kinked once or several times (double or multiple delta). The wing may have outwardly and/or inwardly curved leading edges.

BACKGROUND OF THE INVENTION

In the design of a vertical/short takeoff and landing aircraft, the different components of the thrust may be furnished in several ways to provide a lift-thrust arrangement. A regular version of a fighter plane is provided, for example, with at least one power unit with swivelling nozzles which during hovering flight generates the required vertical lift by turning the swivelling nozzles in a perpendicular position and which during cruising flight produces the required horizontal thrust by swivelling the nozzles in the rearward direction.

A typical embodiment for transport planes utilizes a mixed lift-thrust assembly. The vertical lift is substantially produced by special lift engines or lift fans, and the horizontal thrust is furnished by a cruising engine. With this arrangement the cruising power unit may also be used during hovering flight to support the lift by means of a suitable jet deflecting device.

Finally, so-called compound power units are known which consist of a cruise engine and a plurality of non-independent lift fans. In this case compressed air behind the compresser stage is taken from the cruise engine and fed to the blade tip turbine which then drives the lift fan.

Of course, other combinations of the above-mentioned types of power units are possible.

When these power unit assemblies are installed, besides the structural point of view aerodynamic requirements (which relate essentially to the power and safety of the aircraft) must be met. Thus, when such a V/STOL aircraft is being designed care must be taken to ensure that interference of engine flow and airframe flow is as low as possible. On the one hand the lift engines or lift fans need undistorted air during hovering flight and in the transition phase in order to be able to produce the required lift. On the other hand, during the transition to horizontal flight a stable wing flow should develop as soon as possible in order to produce the required aerodynamic lift for the aircraft. However, since during hovering and transition the lift engines or lift fans suck in the air practically from all directions and their outlet jets have strong suction effects on their environment, undesirable distortions may occur due to mutual interferences of engine flow and wing flow.

In the known designs for V/STOL aircraft the power units for producing vertical lift are installed in the fuselage, in the wings or in nacelles which are themselves fastened to the airframe. Such designs are characterized, to a major part, by strong interferences during the transition phase or during short take-off and landing. The reason for this is that the power units, when seen in the direction of flight, are placed partly before and partly behind the wing the flow of which is strongly dependent on angle of incidence and angle of side-slip.

By such an arrangement of power units and wings on one side strong, variable decrease in lift at the wing arises because of the engine jets; on the other side the intake flow is subjected to interferring changes in the upwash in front of the wing and in the down wash behind the wing. Thus, the necessary vertical lift is reduced and the performance of the aircraft is decreased.

Since the number of revolutions of the power unit does not remain constant during the various flying maneuvers, there results a varying degree of intake flow which again results in varied interference flows and produces strong changing moments from the tail to the longitudinal and lateral motion of the aircraft. This may lead to difficulties in controlling the aircraft and may reduce its safety.

SUMMARY OF THE INVENTION

It is an object of the present invention to solve those problems enumerated above by providing a suitable arrangement of the power unit assembly on the airframe of a V/STOL aircraft.

It is a further object of the invention to reduce the interference between engine and airframe flow on a V/STOL aircraft.

It is another object of the invention to reduce the interference between engine and airframe flow on a V/STOL aircraft in such a manner that this reduction is little dependent on the angle of incidence and the angle of side-slip as well as on the number of revolutions of the engine.

It is still a further object of the invention to reduce the interference between airflows and prevent unfavorable influence on the pitching moment by variable horizontal tail flow.

This is accomplished, according to the present invention in that the delta wing assembly consists of an auxiliary air foil and a main wing. This auxiliary air foil is arranged to be upwardly offset with respect to the plane of the main wing so that a slot is produced between the auxiliary air foil and the main wing in a direction transverse to the direction of flight.

In a further embodiment of the present invention the auxiliary air foil is pivotally mounted at the aircraft fuselage so that its setting with respect to the direction of air flow can be varied.

A particular advantage of the aircraft design according to the present invention is the delta wing which, due to its sufficient longitudinal extent in the vicinity of the fuselage of the aircraft, results in the required thickness for the installation of lift engines or lift fans. At the same time the installation of these lift units in the delta wing produces an arrangement wherein intake openings and exit nozzles are spaced so far from the leading and trailing edges of the wing that the above-mentioned interference phenomena are reduced.

DESCRIPTION OF THE PREFERRED EMBODIMENTS

Figure 1:
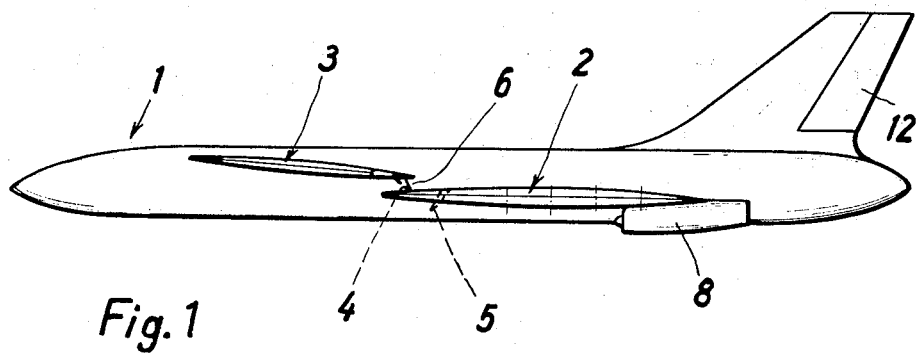
FIG. 1 is a side elevation view of a V/STOL aircraft according to one embodiment of the invention.
Figure 2:
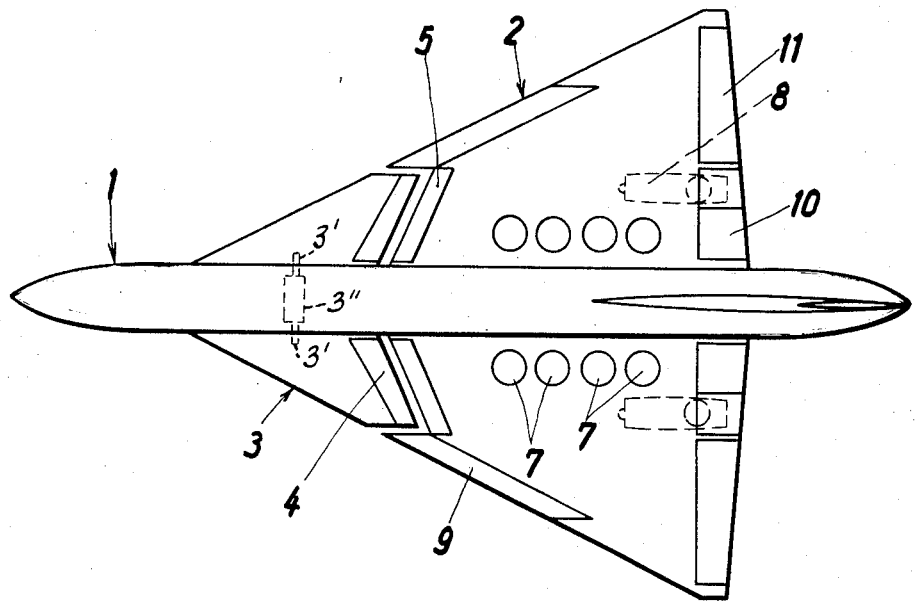
FIG. 2 is a top plan view of the aircraft shown in FIG. 1 and showing the configuration of a delta wing with a constant sweepback.

FIGS. 1 and 2 show an aircraft, generally indicated at 1, according to one embodiment of the present invention, wherein a delta wing assembly has a constant sweepback, i.e., straight leading edges. The main wing of the assembly, generally indicated at 2, is provided with flaps 5 at its leading edge. Disposed in front of the main wing and slightly upward therefrom there are auxiliary air foils generally indicated at 3. The auxiliary air foils 3 are provided at their rear edges with flaps 4. As can be seen, the main wing and the auxiliary air foils have an air space or slot 6 therebetween. Behind gap 6 in the direction of flight, lift units 7 are built into the main wing 2 in the region of the span of the auxiliary air foils 3. The details of such lift units or power unit members are not shown in detail but are lift fans of known design. The required horizontal thrust is furnished by cruise engines 8 which may be provided with a jet deflection device for supporting the vertical lift. This type of power unit assembly thus constitutes a mixed lift-thrust system in which the required lift or thrust component is produced by specific power units.

Flaps 9 are provided at the leading edges of the main wing 2, and at the trailing edges of wing 2, there are flaps 10, aileron 11 and rudder 12.

The operation of the aircraft illustrated in FIGS. 1 and 2 will be explained. During the transition phase an undisturbed stable slot flow is produced by slot 6 on the upper side of the main wing 2. On the other hand, even with large angles of incidence, a stable vortex flow is produced above auxiliary air foils 3 during short take-off or in the transition phase, which vortex flow is superimposed on the slot flow on the suction side of the main wing 2. With this combined effect of slot 6 and auxiliary air foils 3 a stable air intake flow is assured for the lift unit 7.

A stable vortex flow is simultaneously produced outside of the lift units 7 at the side edges of the main wing 2. In flights with an angle of side-slip the different airflows at the two wing parts can be compensated by the flaps 9. The control and trimming of the aircraft in its longitudinal and lateral motion is made possible by the flaps 10 and aileron 11 and rudder 12.

Thus, in an aircraft according to the present invention there is produced a stable air flow shape with its slot air flow and the two vortex systems at the auxiliary air foils and the main wing. As a result the aircraft is safer, particularly during short take-off and landing and during the transition phase.

A further improvement in the properties of a V/STOL aircraft is achieved in that the effects of interfering air flows on the elevator unit of the aircraft is eliminated. In addition, safe characteristics, in V/STOL aircraft also mean a direct increase in power output because control thrusts (e.g. tapped engine air, which escapes from control nozzles at the nose, tail and at the wing tips or thrust modulation) and reserve thrusts (excess thrust for the case of a engine failure) can be reduced.

With the present invention there is an increase in power output for the entire vertical thrust as compared to other VSTOL aircraft because the lift losses resulting from jet interference are less. This effect is made possible, on the one hand, because the power units are far enough from the edges of the wings. On the other hand, the embodiment according to the present invention permits a positive setting of the pivotal auxiliary air foils. The air foils 3 can be pivotally mounted on pivot pins 3', which are connected to a suitable control mechanism 3", shown in phantom outline, as is conventional and is shown in U.S. Pat. No. 3,270,989. Thus, in spite of the jet induced downwash at the leading edge of the wing, it is possible to produce a lift at the auxiliary air foils and a positive change of moment about the transverse axis of the aircraft. Compared with conventional configurations with horizontal tail surface control—where a tail down moment is paid for by a loss in lift—the arrangement of the present invention produces an increase in lift.

Figure 3:
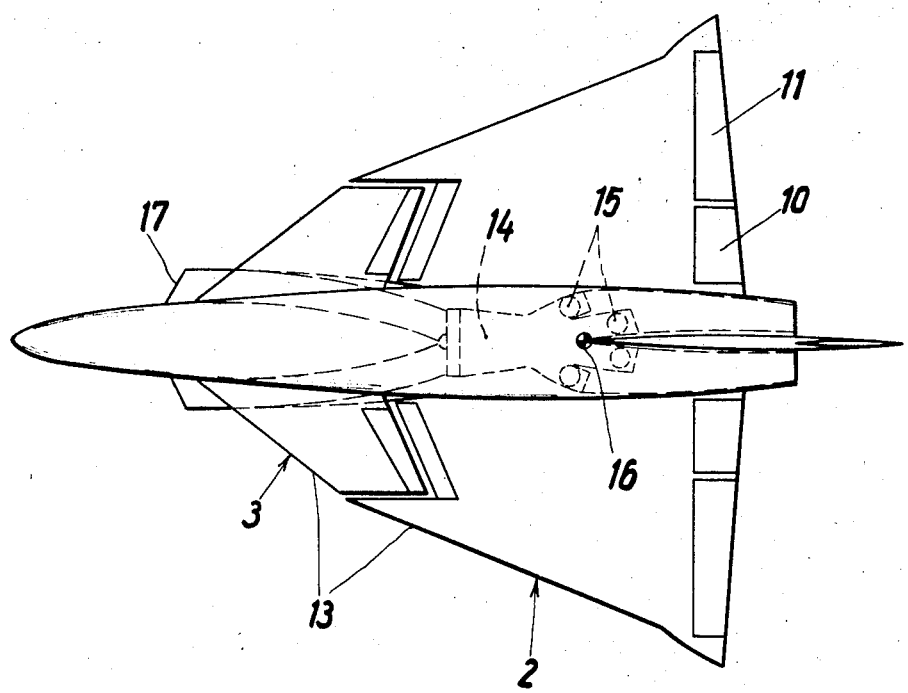
FIG. 3 is a top plan view of another embodiment of the invention in which there is a non-linear leading edge on the delta wing.

FIG. 3 shows another embodiment of the invention for a different type of V/STOL aircraft. In this case, the aircraft is a fighter plane with a double delta wing into which auxiliary air foils 3 are also integrated. The leading edges 13 of the delta wing assembly is kinked between the auxiliary air foils 3 and the main wing 2. The power unit assembly in this embodiment, consists only of one engine 14 which is provided with pivotal exit nozzles 15 in front of and behind the center of gravity 16 of the aircraft for producing vertical and horizontal thrust.

With this type of power unit design the problem of interference from the engine intake flow and the airframe air flow is eliminated because the air intakes 17 are disposed ahead of the leading edges 13 of the delta wing. Interferences between the flow of the exit jets and the air frame air flow are kept low in this design in the same manner as that described for the embodiment of FIGS. 1 and 2.

It will be understood that the above description of the present invention is susceptible to various modifications, changes and adaptations, and the same are intended to be comprehended within the meaning and range of equivalents of the appended claims.

I claim:

1. A V/STOL aircraft with an air frame having a fuselage carrying a delta wing assembly, and a power unit assembly, comprising in combination:
   (a) a main wing section forming a portion of the delta wing assembly; and
   (b) an auxiliary air foil section forming the remaining portion of the delta wing assembly, said auxiliary air foil section lying in front of said main wing section but disposed to be upwardly offset with respect to the plane of said main wing section, whereby an air slot is defined between associated edge portions on said sections to extend transversely to the fuselage.

2. A V/STOL aircraft as in claim 1, wherein said auxiliary air foil section is pivotally mounted on the fuselage to move about an axis which is transverse to the longitudinal axis of the fuselage.

3. A V/STOL aircraft as in claim 1, wherein said associated edge portions comprise movable flaps mounted on said sections.

4. A V/STOL aircraft as in claim 1, wherein the power unit assembly includes vertical thrust producing members mounted on said main wing section on opposite sides of the fuselage rearwardly of said transversely extending air slots defined between said sections of the delta wing assembly.

5. A V/STOL aircraft as in claim 1, wherein the power unit assembly is mounted with pivotal exit-nozzles in front of and behind the center of gravity of the aircraft for producing vertical and horizontal thrust.

6. A V/STOL aircraft as in claim 5, wherein air intake means for the power unit assembly are disposed in front of said auxiliary air foil section.

References Cited

UNITED STATES PATENTS

| | | | |
|---|---|---|---|
| 3,478,989 | 11/1969 | Bielefeldt | 244—46 X |
| 3,270,989 | 9/1966 | Polhamus et al. | 244—46 |

FOREIGN PATENTS

| | | | |
|---|---|---|---|
| 1,446,976 | 6/1966 | France | 244—12 B |

TRYGVE M. BLIX, Primary Examiner

U.S. Cl. X.R.

244—12 B